United States Patent
Ito et al.

(10) Patent No.: US 7,591,591 B2
(45) Date of Patent: Sep. 22, 2009

(54) DYNAMIC BEARING DEVICE

(75) Inventors: Kenji Ito, Kuwana (JP); Ryouichi Nakajima, Kuwana (JP)

(73) Assignee: NTN Corporation, Osaka-Shi (JP)

( * ) Notice: Subject to any disclaimer, the term of this patent is extended or adjusted under 35 U.S.C. 154(b) by 287 days.

(21) Appl. No.: 10/570,144

(22) PCT Filed: Oct. 12, 2004

(86) PCT No.: PCT/JP2004/015338

§ 371 (c)(1),
(2), (4) Date: Sep. 18, 2006

(87) PCT Pub. No.: WO2005/036001

PCT Pub. Date: Apr. 21, 2005

(65) Prior Publication Data

US 2007/0104400 A1  May 10, 2007

(30) Foreign Application Priority Data

Oct. 14, 2003  (JP) .............................. 2003-353719

(51) Int. Cl.
*F16C 32/06*  (2006.01)

(52) U.S. Cl. ....................................... 384/107; 384/119

(58) Field of Classification Search ................ 384/100, 384/107, 112–119, 121–123, 130–132; 310/90; 360/99.07, 99.08
See application file for complete search history.

(56) References Cited

U.S. PATENT DOCUMENTS

| | | | |
|---|---|---|---|
| 6,390,681 B1 * | 5/2002 | Nakazeki et al. ............ | 384/107 |
| 6,921,208 B2 * | 7/2005 | Yamashita et al. .......... | 384/107 |
| 7,025,505 B2 * | 4/2006 | Komori et al. .............. | 384/119 |
| 7,029,179 B2 * | 4/2006 | Shishido et al. ............. | 384/112 |
| 2002/0172438 A1 | 11/2002 | Nakagawa et al. | |
| 2004/0028299 A1 * | 2/2004 | Shishido et al. ............. | 384/107 |

FOREIGN PATENT DOCUMENTS

| JP | 5-118322 | | 5/1993 |
|---|---|---|---|
| JP | 2001-27226 | | 1/2001 |
| JP | 2001027225 A | * | 1/2001 |
| JP | 2001-107972 | | 4/2001 |
| JP | 2001-336524 A | * | 12/2001 |
| JP | 2002-339957 | | 11/2002 |
| JP | 2003-184868 | | 7/2003 |

* cited by examiner

*Primary Examiner*—Marcus Charles
(74) *Attorney, Agent, or Firm*—Wenderoth, Lind & Ponack, L.L.P.

(57) ABSTRACT

It is an object to improve bearing rigidity in a thrust direction at high temperatures and reduce a torque at low temperatures. An axial member is arranged in such a manner that an outer circumferential surface of an axial part is opposed to an inner circumferential surface of a bearing sleeve with a radial bearing gap interposed therebetween, and both end faces of a flange part are opposed to one end face of the bearing sleeve and a bottom face of a housing with thrust bearing gaps interposed therebetween, respectively. In this manner, the axial member is supported by dynamic pressures generated in the respective bearing gaps in the thrust direction in a non-contact manner. The flange part of the axial member is formed of a resin in such a manner that its linear expansion coefficient in its axial direction is equal to or larger than that of the housing.

21 Claims, 4 Drawing Sheets

DYNAMIC BEARING DEVICE

TECHNICAL FIELD

The present invention relates to a dynamic bearing device. The dynamic bearing device of the present invention is suitable for use in an spindle motor for information equipment including a magnetic disk device such as an HDD or an FDD, an optical disk device for a CD-ROM, a CD-R/RW or a DVD-ROM/RAM, and a magnetooptical disk device for an MD or an MO; a polygon scanner motor of a laser beam printer (LBP); a color wheel of a projector; and a small motor for electrical equipment such as an axial flow fan, for example.

BACKGROUND ART

A dynamic bearing supports an axial member in a non-contact manner by a fluid dynamic pressure generated in a gap in the bearing. A bearing device using such a dynamic bearing (hereinafter, referred to as dynamic bearing device) is generally classified into a contact type and a non-contact type. In the contact type, a radial bearing part is formed by a dynamic bearing while a thrust bearing part is formed by a pivot bearing. In the non-contact type, both the radial bearing part and the thrust bearing part are formed by dynamic bearings. Those two types of bearing devices are used to suit their application.

An exemplary dynamic bearing device of a non-contact type is disclosed in Japanese Patent Laid-Open Publication No. 2000-291648 proposed by the applicant of the present application. This dynamic bearing device has a T-shaped axial member including an axial part and a flange part that are integrated as one unit in order to reduce a cost and improve precision.

Conventionally, in many cases, an axial member with a flange part is formed from stainless steel in consideration of abrasion resistance, while a housing is formed from brass in consideration of processability. In these cases, the amount of thermal expansion in an axial direction when the temperature increases is larger in the housing formed of brass than in the flange part formed of stainless steel because brass has a larger linear expansion coefficient than that of stainless steel. In a general dynamic bearing device, because of decrease of viscosity of fluid (oil) at high temperatures, decrease of bearing rigidity, especially in a thrust direction is a problem. This bearing rigidity in the thrust direction further decreases when the linear expansion coefficient of the housing is larger than that of the flange part. This is because the width of the gap in the thrust bearing becomes larger at high temperatures. On the other hand, at low temperatures, a motor torque is increased by increase of viscosity of fluid. The difference between the above linear expansion coefficients acts to increase the motor torque. As described above, the conventional structure has a drawback that the difference of the amount of thermal expansion between the flange part and the housing acts to aid the aforementioned problems both at high temperatures and at low temperatures.

SUMMARY OF THE INVENTION

In view of the above-described situation, it is an object of the present invention to increase bearing rigidity in a thrust direction at high temperatures and reduce a torque at low temperatures.

In order to achieve the above object, according to the present invention, a dynamic bearing device comprises: a housing; a bearing sleeve fixed to an inner circumferential surface of the housing; an axial member including an axial part inserted into an inner circumference of the bearing sleeve and a flange part thrusting out toward an outside diameter of the axial part; and a thrust bearing part for supporting the axial member in a thrust direction in a non-contact manner by an action of a dynamic pressure of a fluid generated in a gap in the thrust bearing part, the gap facing the flange part, wherein the flange part is formed of a resin and has a linear expansion coefficient in an axial direction equal to or larger than a linear expansion coefficient of a housing in the axial direction.

As described above, by setting the linear expansion coefficient of the flange part in the axial direction to be equal to or larger than that of the housing in the axial direction, the thrust bearing gap becomes smaller at high temperatures because of thermal expansion of the flange part formed of a resin. Thus, decrease of bearing rigidity in the thrust direction at high temperatures can be suppressed. On the other hand, at low temperatures, the thrust bearing gap becomes larger because of the difference of the amount of thermal expansion in the axial direction. Thus, increase of a motor torque at low temperatures can be suppressed.

The linear expansion coefficient of a resin can be freely varied by changing the amount of fillers to be mixed with that resin (including a reinforcement such as a carbon fiber, a conductive material, and other additives). Thus, in the case where the flange part is formed of a resin, even when a different material having a different linear expansion coefficient is used as the material for the housing, the linear expansion coefficient of the flange part in the axial direction can be adapted to the aforementioned condition by changing the amount of mixed filler therewith.

In order to ensure the conductivity of the axial member, it is desirable to form the flange part from a conductive resin having volume resistivity of $10^6$ Ω·cm or less.

More specifically, in the case where the housing is formed of a resin, the linear expansion coefficient of the resin forming the flange part is set to fall within a range from $2 \times 10^{-5}$ to $9 \times 10^{-5}$/° C. In the case where the housing is formed of brass, the linear expansion coefficient of the resin forming the flange part is set to fall within a range form $2 \times 10^{-5}$ to $5 \times 10^{-5}$/° C.

In the above structure, the axial member can have a structure in which an outer circumference of the axial part is formed of a hollow cylindrical metal material and a core of the axial part and the flange part are formed of a resin integrally with each other. By forming the outer circumference of the axial part by a metal material, it is possible to ensure strength and rigidity that are required for the axial member, as well as abrasion resistance of the axial part with respect to a metal bearing sleeve formed of a sintered metal or the like. Moreover, since many parts of the axial member (the core of the axial part and the flange part) are formed of a resin, the weight of the axial member can be reduced. Thus, it is possible to reduce impact load when the axial member collides with other bearing components (the bearing sleeve, the bottom of the housing, or the like) and to avoid generation of a flaw or damage due to the collision. In addition, since the flange part is formed of a resin and has small sliding friction, it is possible to reduce a friction coefficient between the flange part and the other bearing component facing the flange part.

A motor including the aforementioned dynamic bearing device, a rotor magnet, and a stator coil has high thrust bearing rigidity at high temperatures and a low torque at low temperatures, and also has a feature of a low cost.

DETAILED DESCRICTION OF THE INVENTION

Embodiments of the present invention will now be described hereinafter with reference to FIGS. 1 through 5.

Figure 1:
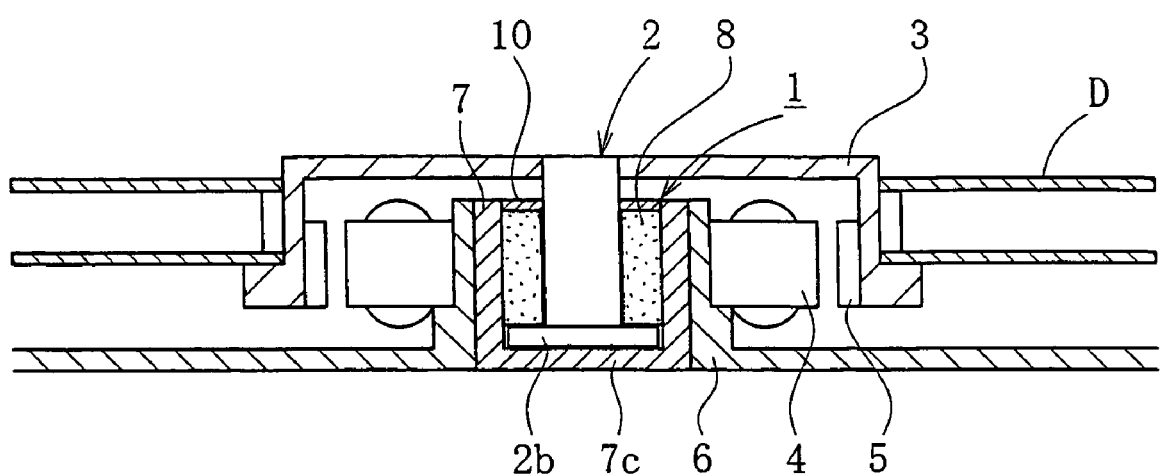
FIG. 1 is a cross-sectional view of a spindle motor for information equipment, including a dynamic bearing device according to the present invention.

FIG. 1 shows an exemplary structure of a spindle motor for information equipment, in which a dynamic bearing device 1 according to an embodiment of the present invention is incorporated. This spindle motor is used in a disk driving device such as an HDD, and includes a dynamic bearing device 1 that supports an axial member 2 in a non-contact manner to be freely rotatable, a disk hub 3 attached to the axial member 2, and a stator coil 4 and a rotor magnet 5 that are arranged to be opposed with each other with a gap in a radial direction interposed therebetween. The stator coil 4 is attached to an outer circumference of a bracket 6, and the rotor magnet 5 is attached to an inner circumference of the disk hub 3. A housing 7 of the dynamic bearing device 1 is fixed to the inner circumference of the bracket 6 by means of adhesion, for example. The disk hub 3 holds one or more disks D such as magnetic disks. When a current is applied to the stator coil 4, the rotor magnet 5 is rotated by an exciting force between the stator coil 4 and the rotor magnet 5, so that the disk hub 3 and the axial member 2 are rotated as one unit.

Figure 2:
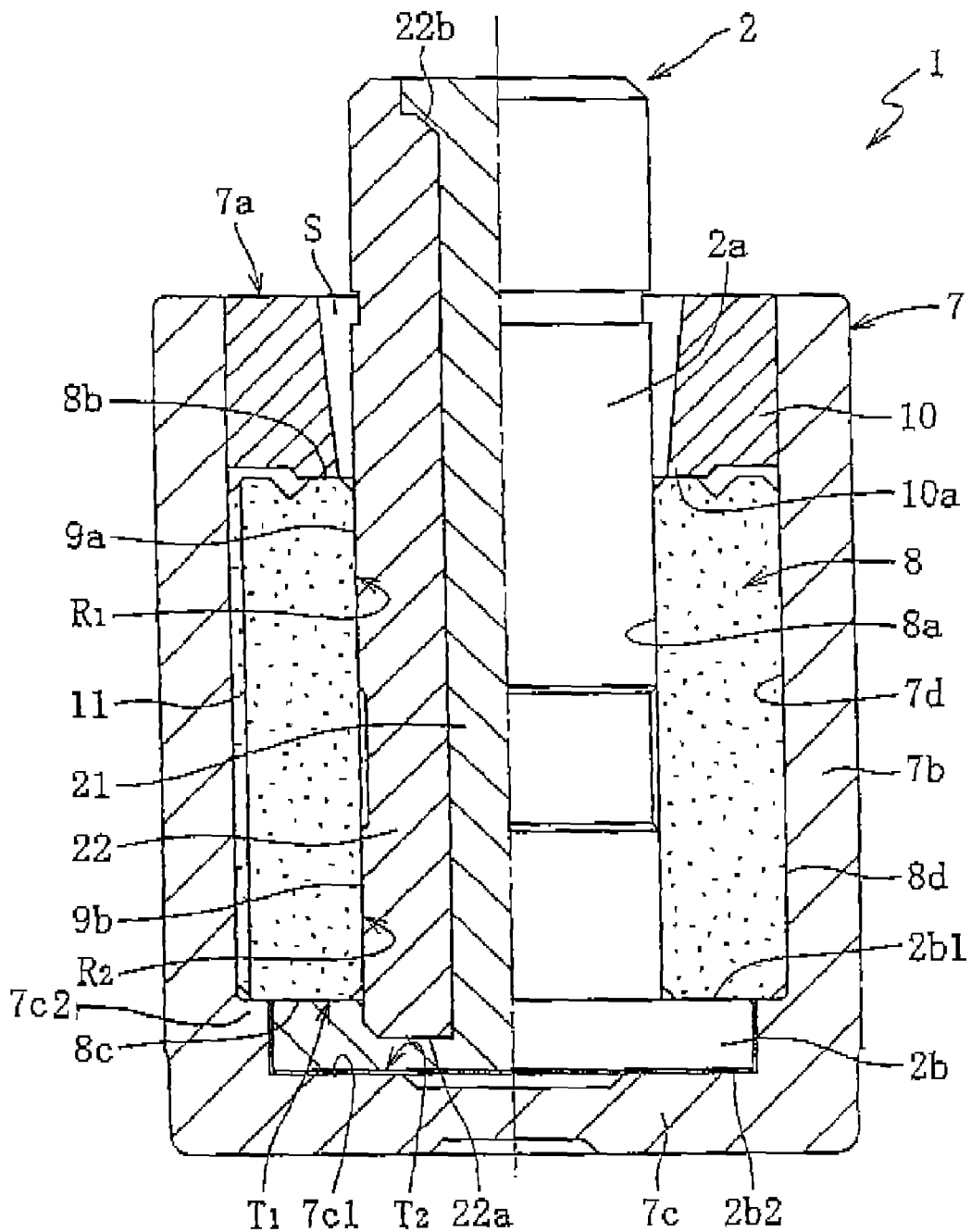
FIG. 2 is a cross-sectional view of the dynamic bearing device.

FIG. 2 shows the dynamic bearing device 1 according to one embodiment of the present invention. The dynamic bearing device 1 mainly includes a cylindrical housing 7 having an opening 7a at one end and a bottom portion 7c at the other end; a cylindrical bearing sleeve 8 fixed to the inner circumferential surface of the housing 7; an axial member 2 composed of an axial part 2a and a flange part 2b; and a seal member 10 fixed to the opening 7a of the housing 7. In the following description, a direction toward the opening 7a of the housing 7 is referred to as an upward direction, while a direction toward the bottom portion 7c of the housing 7 is referred to as a downward direction.

The housing 7 is formed of a soft metal material such as brass, for example, and has a cylindrical side part 7b and the disc-like bottom part 7c that are integrally with each other.

The bearing sleeve 8 is formed of a sintered metal, more specifically, a sintered metal impregnated with oil. On an inner circumferential surface 8a of the bearing sleeve 8, two dynamic pressure generating groove regions each serving as a radial bearing face for generating a dynamic pressure are provided to be axially away from each other.

Figure 3:
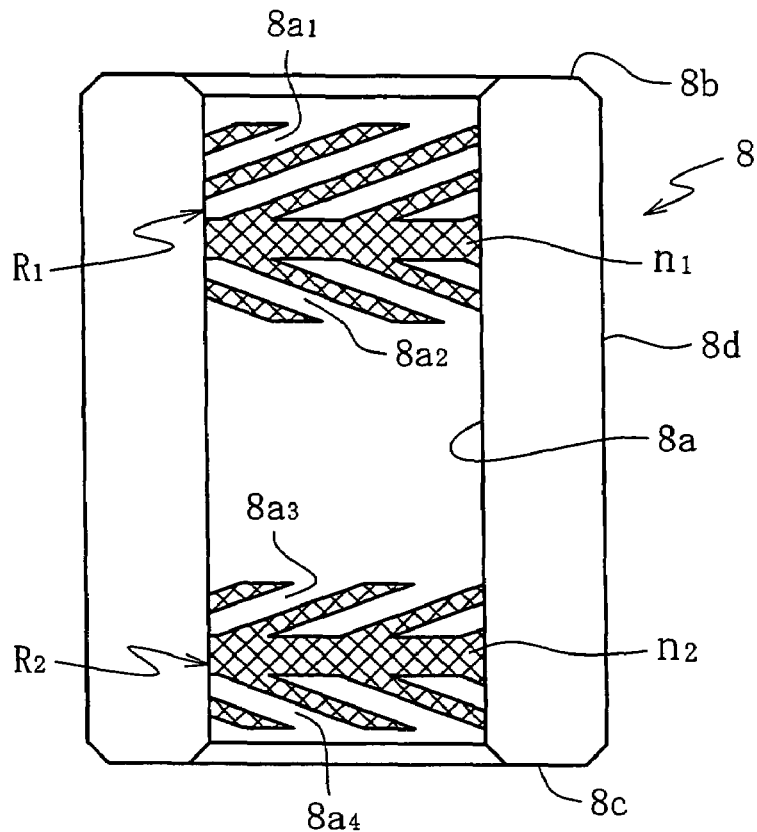
FIG. 3 is a cross-sectional view of a bearing sleeve.

As shown in FIG. 3, the upper radial bearing face has a plurality of dynamic pressure generating grooves 8a1 and 8a2 of a herringbone shape. On this radial bearing face, the length in the axial direction of the dynamic pressure generating grooves 8a1, i.e., the upper dynamic pressure generating grooves in FIG. 3 is larger than that of the dynamic pressure generating grooves 8a2, which are the lower dynamic pressure generating grooves and are inclined toward a direction opposite to an inclined direction of the dynamic pressure generating grooves 8a1. Thus, the dynamic pressure generating grooves 8a1 and 8a2 are asymmetrical with respect to the axial direction. Similarly, the lower radial bearing face has a plurality of dynamic pressure generating grooves 8a3 and 8a4 of a herringbone shape. The dynamic pressure generating grooves 8a3 that are inclined toward one side of the axial direction are arranged to be away from the dynamic pressure generating grooves 8a4 that are inclined to the other side of the axial direction, in the axial direction. However, in this embodiment, the dynamic pressure generating grooves 8a3 and 8a4 are the same in the length in the axial direction and therefore are symmetrical with respect to the axial direction, unlike the dynamic pressure generating grooves 8a1 and 8a2 on the upper radial bearing face. The length in the axial direction of the upper radial bearing face (distance between the upper end of the dynamic pressure generating groove 8a1 and the lower end of the dynamic pressure generating groove 8a2) is larger than that of the lower radial bearing face (distance between the upper end of the dynamic pressure generating groove 8a3 and the lower end of the dynamic pressure generating groove 8a4). Radial bearing gaps 9a and 9b are formed between the upper and lower radial bearing faces on the inner circumferential surface of the bearing sleeve 8 and the outer circumferential surface of the axial part 2a that is opposed to them.

In general, in the dynamic pressure generating grooves that are inclined with respect to the axial direction, such as grooves of herringbone shape, an action of pulling oil in the axial direction is generated while the bearing is operated. Thus, in the present embodiment, the dynamic pressure generating grooves 8a1 through 8a4 serve as oil-pulling parts. Oil pulled into the radial bearing gaps 9a and 9b by those oil-pulling parts 8a1 through 8a4 is collected near smooth parts n1 and n2 that are arranged between the dynamic pressure generating grooves 8a1 and 8a2 and between the dynamic pressure generating grooves 8a3 and 8a4, respectively, so as to form an oil layer that continues in the circumferential direction.

At this time, the oil that has been filled in a gap between the outer circumferential surface of the axial part 2a and the inner circumferential surface 8a of the bearing sleeve 8 is pushed down as a whole because of the asymmetry of the upper radial bearing face and the difference of the axial length between the upper and lower radial bearing faces. In order to bring back the oil that has been pushed down upward, the outer circumferential surface 8d of the bearing sleeve 8 is provided with a circular groove 11 that is opened at both end faces 8b and 8c of the bearing sleeve 8. This circular groove may be formed on the inner circumferential surface 7d of the housing.

As shown in FIG. 2, the seal member 10 as sealing means is an annular member and is secured to the inner circumferential surface of the opening 7a of the housing 7 by press fitting, adhesion, or the like. In this embodiment, the inner circumferential surface of the seal member 10 is tapered in such a manner that the diameter of the inner circumferential surface thereof becomes larger upward. A projecting part 10a is formed on the lower end face of the seal member 10 at the innermost position in the radial direction. The end face of the projecting part 10a is in contact with the upper end face 8b of the bearing sleeve 8. The lower end face of the seal member except for the projecting part 10a is in a non-contact state with respect to the upper end face 8b of the bearing sleeve 8.

Between the tapered inner circumferential surface of the seal member 10 and the outer circumferential surface of the axial part 2a that is opposed thereto is formed a tapered seal space S that gradually expands toward the upper portion of the housing 7. The space in the housing 7 that is sealed with the seal member 10 is filled with a lubricating oil. The respective gaps in the housing, i.e., the gap between the outer circumferential surface of the axial part 2a and the inner circumferential surface 8a of the bearing sleeve 8 (including the radial bearing gaps 9a and 9b), the gap between the lower end face 8c of the bearing sleeve 8 and the upper end face 2b1 of the flange part 2b, and the gap between the lower end face 2b2 of the flange part and the inner bottom face 7c1 of the housing 7 (bottom portion of the housing 7) are filled with a lubricating oil. An oil surface is in the seal space S.

The axial part 2a of the axial member 2 is inserted into the inner circumferential surface 8a of the bearing sleeve 8. The flange part 2b is accommodated in a space between the lower end face 8c of the bearing sleeve 8 and the inner bottom face 7c1 of the housing 7. The upper and lower radial bearing faces on the inner circumferential surface 8a of the bearing sleeve 8 are opposed to the outer circumferential surface of the axial part 2a with the radial bearing gaps 9a and 9b interposed therebetween, and form a first radial bearing part R1 and a second radial bearing part R2, respectively.

As shown in FIG. 2, the axial member 2 has a combined structure of a resin member 21 and a metal member 22. The core of the axial part 2a and the entire flange part 2b are formed as one unit by the resin member 21, while the outer circumference of the axial part 2a is covered throughout its length with the hollow cylindrical metal member 22. As the material for the resin member 21, thermoplastic resins such as nylon 66, LCP, and PES can be used. Fillers containing reinforcement materials or the like, is mixed with the above base resin material, if necessary. As the material for the metal member 22, metals having excellent abrasion resistance, such as stainless steel, are used. In some applications of a motor, the use of materials containing Si element is prohibited in consideration of a relationship between the material and required cleanliness. Thus, in such cases, it is necessary to choose materials containing no Si element when the material for the resin member 21 is prepared. For example, as a reinforcement material, glass fibers are not used. Instead, carbon fibers or another type of reinforcement materials containing no Si is used.

In order to prevent the resin member 21 and the metal member 22 from being separated from each other, at the lower end of the axial part 2a of the axial member 2 (in the left part in FIG. 2), the end of the metal member 22 is embedded in the flange part 2b. On the other hand, at the upper end of the axial part 2a, the metal member 22 and the resin member 21 are axially engaged via an engagement part. In the shown example, a tapered face 22b having a diameter that becomes larger upward as an exemplary engagement part is used for engaging them. In order to prevent rotation of the metal member 22, it is desirable to provide a convexo-concave engagement part that can engage with the flange part 2b in the circumferential direction, by knurling or the like, on the outer circumference or the edge of the end of the metal member 22 embedded in the flange part 2b.

The axial member 2 is fabricated by injection molding (insert molding) of a resin, using the metal member 22 as an insert part, for example. In case of insert molding, it is possible to mass-produce the axial member 2 at a low cost while ensuring the required precision, by increasing the precision of the mold and positioning the metal member 22 as the insert part within the mold with high precision. Moreover, assembly of the axial part 2a and the flange part 2b is completed simultaneously with the above molding. Thus, as compared with the case in which the axial part and the flange part are separately formed of metal and are then integrated as one unit by press fitting or the like, in a later process, the number of necessary processes can be reduced. Thus, the cost can be further reduced. In order to improve the molding precision, it is desirable that a flowing direction of the resin in the mold during injection molding be made coincident with the axial direction of the axial member 2.

Figure 4A:
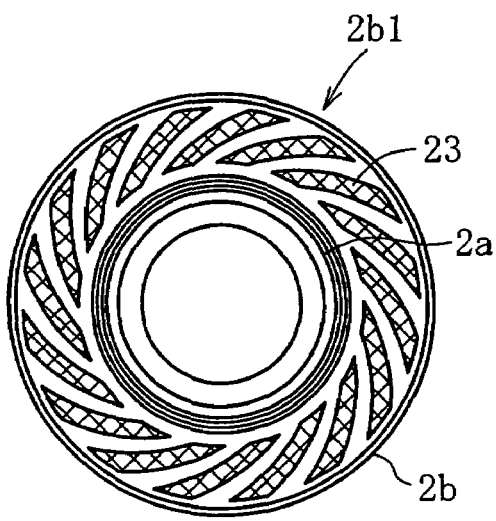
FIGS. 4(a) and (b) are a top view of a flange part of an axial member and a bottom view thereof, respectively.
Figure 4B:
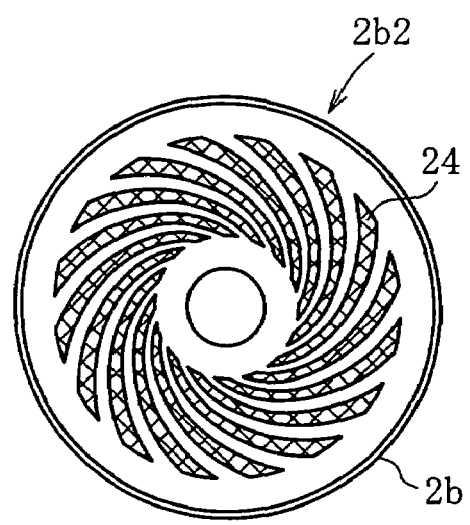

On both end faces 2b1 and 2b2 of the flange part 2b, dynamic pressure generating groove regions each serving as a thrust bearing face for generating a dynamic pressure are formed. On the thrust bearing faces, a plurality of dynamic pressure generating grooves 23 and 24 that are spiral, for example, are formed as shown in FIGS. 4(a) and (b). Those dynamic pressure generating grooves 23 and 24 are molded simultaneously with injection molding of the flange part 2b. The thrust bearing face formed on the upper end face 2b1 of the flange part 2b is opposed to the lower end face 8c of the bearing sleeve 8 with a thrust bearing gap sandwiched therebetween, so that the first thrust bearing part T1 is formed. The thrust bearing face formed on the lower end face 2b2 of the flange part 2b is opposed to the inner bottom face 7c1 of the bottom 7c of the housing with a thrust bearing gap sandwiched therebetween, so that the second thrust bearing part T2 is formed. The thickness (width in the axial direction) of the flange part 2b is 0.5 to 1.0 mm, and the total width of the two thrust bearing gaps falls within a range of 18±5 μm.

According to the above structure, when the axial member 2 and the bearing sleeve 8 are rotated with respect to each other, i.e., when the axial member 2 is rotated in the present embodiment, a dynamic pressure of lubricating oil is generated in the radial bearing gaps 9a and 9b in both the radial bearing parts R1 and R2 by actions of the dynamic pressure generating grooves 8a1 through 8a4 as described above. Thus, the axial part 2a of the axial member 2 is supported by a layer of the lubricating oil formed in the respective radial bearing gaps in a non-contact manner so as to be freely rotatable in the radial direction. At the same time, a dynamic pressure of lubricating oil is generated in the respective thrust bearing gaps in both the thrust bearing parts T1 and T2 by actions of the dynamic pressure generating grooves 23 and 24, so that the flange part 2b of the axial member 2 is supported by a layer of the lubricating oil formed in the respective thrust bearing gaps in a non-contact manner so as to be freely rotatable in both thrust directions.

In the present invention, a linear expansion coefficient in the axial direction (i.e., flowing direction of a resin MD) of the flange part 2b made of a resin is set to be equal to or larger than that of the housing side portion 7b that faces the outer diameter of the flange part 2b (i.e., projection part 7c2). (In the following description, a linear expansion coefficient in the axial direction is simply referred to as a "linear expansion coefficient".) Thus, the amount of thermal expansion of the flange part 2b in the axial direction becomes equal to or larger than that of the housing 7 at high temperatures, so that the thrust bearing gap becomes small. Therefore, it is possible to suppress decrease of the bearing rigidity in the thrust direction caused by decrease of viscosity of the lubricating oil. In contrast, at low temperatures, the thrust bearing gap becomes large because of the difference of thermal expansion in the axial direction. Therefore, it is possible to suppress increase of a motor torque at low temperatures.

An appropriate range of the linear expansion coefficient of the flange part 2b varies depending on the material for the housing 7. In the case where a brass housing is used as in the present embodiment, for example, a resin material is selected in such a manner that its linear expansion coefficient is 2×10⁻

3/° C. or more because the linear expansion coefficient within that region is larger than that of brass. In this case, if the difference of the linear expansion coefficient between the resin and brass is too large, some troubles, for example, excessively small width of the thrust bearing gap, are expected. Thus, it is desirable that the linear expansion coefficient of the resin be $5 \times 10^{-5}/°$ C. or less.

The housing 7 may be formed of a resin, instead of a soft metal such as brass. In this case, the linear expansion coefficient of the resin forming the flange part. 2b is set to be equal to or larger than that of the resin forming the housing in accordance with that of the resin forming the housing. More specifically, the flange part 2b is molded from a resin material having the linear expansion coefficient that falls within a range from $2 \times 10^{-5}$ to $9 \times 10^{-5}/°$ C. In this case, the housing 7 may be formed of the same type of resin material as the flange part 2b or different resin material from the flange part 2b.

As described above, it is necessary to vary the linear expansion coefficient of the resin used for the flange part 2b in accordance with the material for the housing 7. However, for a resin material, its linear expansion coefficient can be set to a given value by changing the amount of fillers that are mixed with the resin. Thus, the resin material having the optimum linear expansion coefficient in accordance with the material for the housing 7 is easily available.

When selecting the resin material for the flange part 2b, it is necessary to consider not only the linear expansion coefficient but also a mold shrinkage factor for the following reason. In the case where the difference of the mold shrinkage factor between the flowing direction (MD) and the perpendicular direction (TD) is too large, warpage occurs in the flange part 2b after curing, and therefore the bearing property of the thrust bearing part cannot be achieved stably. According to examinations by the inventors of the present invention, it was found that when the difference of the mold shrinkage factor between the flowing direction and the perpendicular direction was 0.3% or less, such a problem of warpage did not occur and the stable bearing property could be achieved. In the axial member 2 of the present embodiment, the axial direction is coincident with the flowing direction while the radial direction is coincident with the perpendicular direction, as described above. Therefore, the above condition can be satisfied by setting the difference of the mold shrinkage factor between the axial direction and the radial direction of the flange part 2b to be 0.3% or less.

Moreover, in this type of dynamic pressure bearing device, electrostatic is generated on a magnetic disk or the like, by friction with air. In the case where the flange part 2b is formed of an insulative resin, this electrostatic cannot escape and may cause troubles such as generation of a potential difference between the magnetic disk and a magnetic head or damage of peripheral equipment caused by electrostatic discharge. In order to prevent such troubles, it is desirable that not only reinforcement materials but also conductive materials such as carbon be mixed with the resin material forming the flange part 2b so that the resin material has volume resistivity of $10^6$ Ω·cm or less. In the case where the housing 7 is formed of a resin, it is desirable to use the similar conductive resin.

Examples of the resin material that satisfies the aforementioned physical properties include a composite material obtained by mixing 62 wt % (78.7 vol %) of PES (Sumitomo Chemical Co., Ltd., PES-3600P) as a base material resin with 10 wt % (5.8 vol %) of aluminum borate whisker (Shikoku Kasei Corp., ALBOREX Y) as a reinforcement material, 20 wt % (7.7 vol %) of barium carbonate (Sakai Chemical Industry Co., Ltd., BW-P) as inorganic particles, and 8 wt % (7.7 vol %) of conductive carbon (KETJENBLACK, EC-6).

For this resin material, linear expansion coefficients in MD and TD are 0.6 and $2.6[\times 10^{-5}/°$ C.], respectively, and volume resistivity is $2.5 \times 10^5 [\Omega \cdot cm]$. Thus, it can satisfy the aforementioned physical properties.

Figure 5:
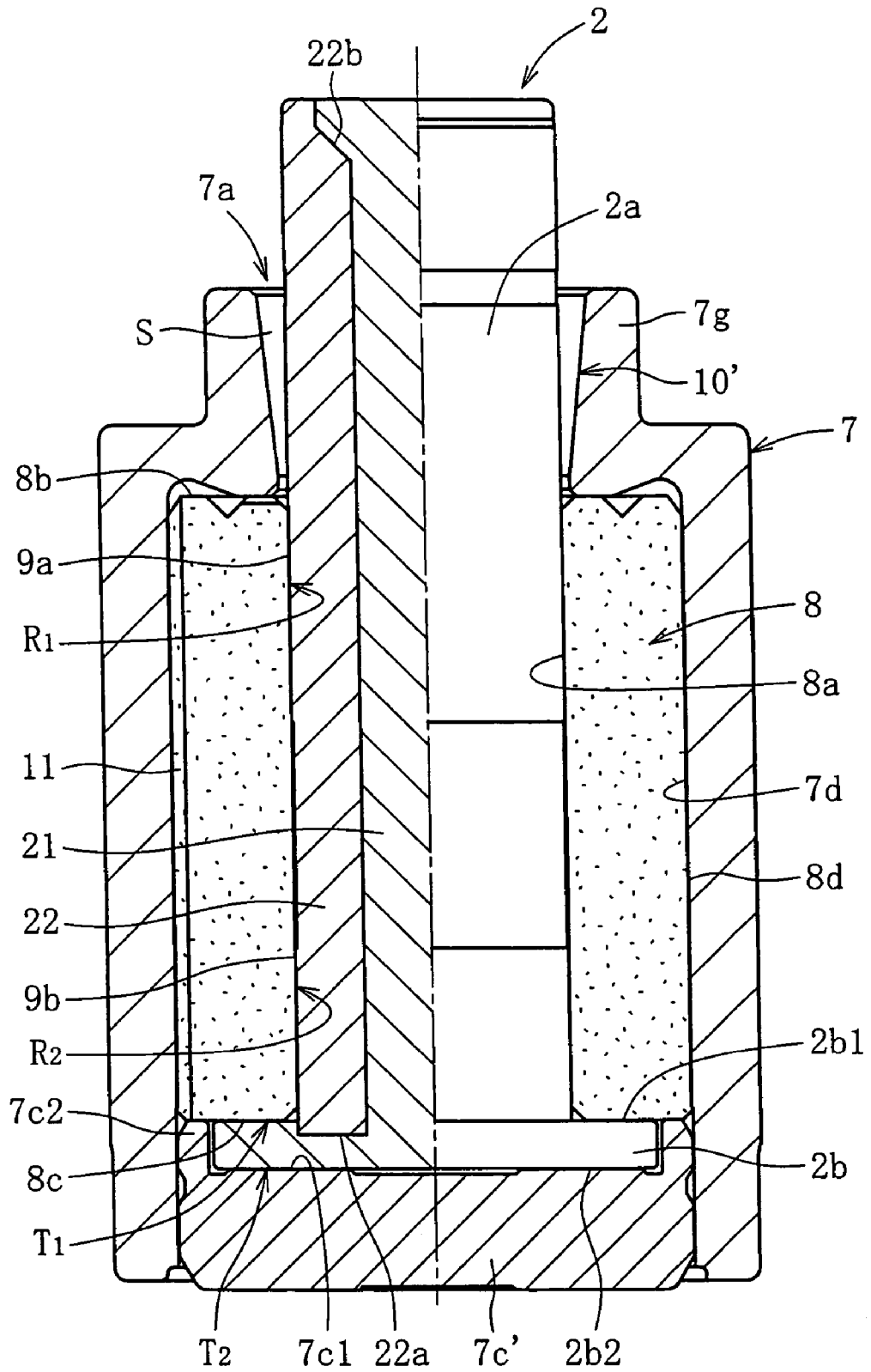
FIG. 5 is a cross-sectional view of a dynamic bearing device according to another embodiment of the present invention.

FIG. 5 shows another embodiment of the present invention. This embodiment is different from the embodiment shown in FIG. 2 in that a bottom part 7c' of the housing 7 is formed as a separate member from the side part 7b and sealing means 10' is integrated with the housing 7 as one unit. The member forming the bottom part 7c' of the housing 7 is secured to the opening at the lower end of the housing side part 7b by means of press fitting, adhesion, or the like. At an outer circumferential edge of the upper face of this member 7c40, an axially projecting part 7c2 is formed. By bringing the upper end of the projecting part 7c2 into contact with the lower end face 8c of the bearing sleeve 8, the width of the thrust bearing gap is defined. At the upper end of the housing side part 7b, a choke part 7g is formed. The inner circumferential surface of the choke part 7g and the outer circumferential surface of the axial part 2a form the sealing means 10'. In this embodiment, the same effects as those obtained in the embodiment shown in FIG. 2 can be also achieved by setting a linear expansion coefficient in the axial direction of the resin forming the flange part 2b to be equal to or larger than that of the housing 7 (in particular, the projecting part 7c2 of the bottom member 7c', which faces the outer circumference of the flange part 2b).

Except for the above, the present embodiment has the same or similar structure and effects as/to those of the embodiment shown in FIG. 2. Thus, the part having the same function/structure in both the embodiments is labeled with the same reference numeral and redundant description is omitted.

The invention claimed is:

1. A dynamic bearing device comprising:
   a housing having an inner circumferential surface;
   a bearing sleeve having an end surface, an inner circumference, and fixed to the inner circumferential surface of the housing;
   an axial member including a flange part having an outer circumference and an axial part having an outside diameter, the axial member being inserted into the inner circumference of the bearing sleeve and the flange part thrusting out toward the outside diameter of the axial part;
   a thrust bearing part including a gap facing the flange part, the thrust bearing part being configured to support the axial member in a thrust direction in a non-contact manner by an action of a dynamic pressure generated by a fluid in the gap in the thrust bearing part; and
   a projecting part in contact with the end surface of the bearing sleeve and facing the outer circumference of the flange part, said projecting part being provided on the housing,
   wherein the flange part is formed of a resin and has a linear expansion coefficient in an axial direction equal to or larger than a linear expansion coefficient of the projecting part in the axial direction.

2. The dynamic bearing device according to claim 1, wherein
   the flange part is formed of a conductive resin having volume resistivity of $10^6$ Ω·cm or less.

3. The dynamic bearing device according to claim 2, wherein:
   the housing is formed of a resin; and
   the linear expansion coefficient of the resin forming the flange part is within a range from $2 \times 10^{-5}$ to $9 \times 10^{-5}/°$ C.

4. The dynamic bearing device according to claim 3, wherein:
   an outer circumference of the axial part of the axial member is formed of a hollow cylindrical metal material and a core of the axial part and the flange part are integrally formed from a resin.

5. A motor comprising:
   the dynamic bearing device according to claim 3;
   a rotor magnet; and
   a stator coil.

6. The dynamic bearing device according to claim 2, wherein:
   the housing is formed of brass; and
   the linear expansion coefficient of the resin forming the flange part is within a range from $2\times10^{-5}$ to $5\times10^{-5}/°$ C.

7. The dynamic bearing device according to claim 6, wherein:
   an outer circumference of the axial part of the axial member is formed of a hollow cylindrical metal material and a core of the axial part and the flange part are integrally formed from a resin.

8. A motor comprising:
   the dynamic bearing device according to claim 6;
   a rotor magnet; and
   a stator coil.

9. The dynamic bearing device according to claim 2, wherein:
   an outer circumference of the axial part of the axial member is formed of a hollow cylindrical metal material and a core of the axial part and the flange part are integrally formed from a resin.

10. A motor comprising:
    the dynamic bearing device according to claim 9;
    a rotor magnet; and
    a stator coil.

11. A motor comprising:
    the dynamic bearing device according to claim 2;
    a rotor magnet; and
    a stator coil.

12. The dynamic bearing device according to claim 1, wherein:
    the housing is formed of a resin; and
    the linear expansion coefficient of the resin forming the flange part is within a range from $2\times10^{-5}$ to $9\times10^{-5}/°$ C.

13. The dynamic bearing device according to claim 12, wherein:
    an outer circumference of the axial part of the axial member is formed of a hollow cylindrical metal material and a core of the axial part and the flange part are integrally formed from a resin.

14. A motor comprising:
    the dynamic bearing device according to claim 12;
    a rotor magnet; and
    a stator coil.

15. The dynamic bearing device according to claim 1, wherein:
    the housing is formed of brass; and
    the linear expansion coefficient of the resin forming the flange part is within a range from $2\times10^{-5}$ to $5\times10^{-5}/°$ C.

16. The dynamic bearing device according to claim 15, wherein:
    an outer circumference of the axial part of the axial member is formed of a hollow cylindrical metal material and a core of the axial part and the flange part are integrally formed from a resin.

17. A motor comprising:
    the dynamic bearing device according to claim 15;
    a rotor magnet; and
    a stator coil.

18. The dynamic bearing device according to claim 1, wherein:
    an outer circumference of the axial part of the axial member is formed of a hollow cylindrical metal material and a core of the axial part and the flange part are integrally formed from a resin.

19. A motor comprising:
    the dynamic bearing device according to claim 18;
    a rotor magnet; and
    a stator coil.

20. A motor comprising:
    the dynamic bearing device according to claim 1;
    a rotor magnet; and
    a stator coil.

21. The dynamic bearing device according to claim 1, wherein
    the flange part extends in an axial direction and a radial direction and a difference of a mold shrinkage factor between the axial direction and the radial direction of the flange part is 0.3% or less.

* * * * *